(12) United States Patent
Male et al.

(10) Patent No.: US 11,138,236 B1
(45) Date of Patent: Oct. 5, 2021

(54) SYSTEMS AND METHODS FOR PACKAGING INFORMATION INTO DATA OBJECTS

(71) Applicant: Palantir Technologies Inc., Palo Alto, CA (US)

(72) Inventors: Christopher Male, Wellington (NZ); Jesse Rickard, Surrey Hills (AU)

(73) Assignee: Palantir Technologies Inc., Palo Alto, CA (US)

( * ) Notice: Subject to any disclaimer, the term of this patent is extended or adjusted under 35 U.S.C. 154(b) by 181 days.

(21) Appl. No.: 15/597,985

(22) Filed: May 17, 2017

(51) Int. Cl.
| | |
|---|---|
| *G06F 16/28* | (2019.01) |
| *H04L 29/08* | (2006.01) |
| *H04L 29/06* | (2006.01) |
| *G06F 16/14* | (2019.01) |
| *G06F 16/951* | (2019.01) |

(52) U.S. Cl.
CPC .......... *G06F 16/285* (2019.01); *G06F 16/144* (2019.01); *G06F 16/951* (2019.01); *H04L 67/02* (2013.01); *H04L 67/2842* (2013.01); *H04L 67/42* (2013.01)

(58) Field of Classification Search
CPC ..... G06F 16/144; G06F 16/951; H04L 67/02; H04L 67/2842; H04L 67/42
See application file for complete search history.

(56) References Cited

U.S. PATENT DOCUMENTS

| | | | |
|---|---|---|---|
| 5,021,792 A | 6/1991 | Hwang | |
| 5,555,503 A | 9/1996 | Kyrtsos et al. | |
| 5,670,987 A | 9/1997 | Doi et al. | |
| 6,141,659 A | 10/2000 | Barker et al. | |
| 6,189,003 B1 | 2/2001 | Leal | |
| 6,272,489 B1 | 8/2001 | Rauch et al. | |
| 6,642,945 B1 | 11/2003 | Sharpe | |

(Continued)

FOREIGN PATENT DOCUMENTS

| | | |
|---|---|---|
| EP | 2400448 | 12/2011 |
| EP | 2816513 | 12/2014 |

(Continued)

OTHER PUBLICATIONS

IBM, "Determining Business Object Structure," IBM, 2004, 9 pages.

(Continued)

*Primary Examiner* — Apu M Mofiz
*Assistant Examiner* — Farhad Agharahimi
(74) *Attorney, Agent, or Firm* — Sheppard Mullin Richter & Hampton LLP

(57) ABSTRACT

Systems, methods, and non-transitory computer readable media are provided for packaging data objects for offline access. A system has access to a database storing information. The system receives a request for a portion of the information. The portion of the information may include one or more dependencies to one or more information sources. The system identifies the one or more dependencies. The system packages the portion of the information and the one or more dependencies into one or more data objects. The data object(s) allow a remote client device to view the portion of the information and the one or more dependencies without having access to the database. The data object(s) are provided by the system to the remote client device.

19 Claims, 6 Drawing Sheets

(56) References Cited

U.S. PATENT DOCUMENTS

| | | | |
|---|---|---|---|
| 7,188,100 B2 | 3/2007 | De Bellis et al. | |
| 7,225,189 B1* | 5/2007 | McCormack | G06F 40/18 |
| 7,383,053 B2 | 6/2008 | Kent et al. | |
| 7,523,100 B1 | 4/2009 | Bionda et al. | |
| 7,529,734 B2 | 5/2009 | Dirisala | |
| 7,652,622 B2 | 1/2010 | Hansen et al. | |
| 7,706,817 B2 | 4/2010 | Bamrah et al. | |
| 7,725,547 B2 | 5/2010 | Albertson et al. | |
| 7,747,648 B1 | 6/2010 | Kraft et al. | |
| 7,945,470 B1 | 5/2011 | Cohen et al. | |
| 8,028,894 B2 | 10/2011 | Lapstun et al. | |
| 8,402,047 B1 | 3/2013 | Mangini et al. | |
| 8,521,135 B2 | 8/2013 | Cryderman | |
| 8,739,059 B2 | 5/2014 | Rabenold et al. | |
| 8,762,870 B2 | 6/2014 | Robotham et al. | |
| 8,849,254 B2 | 9/2014 | Bolon | |
| 9,037,407 B2 | 5/2015 | Thompson | |
| 9,123,086 B1 | 9/2015 | Freeland et al. | |
| 9,262,529 B2 | 2/2016 | Colgrove et al. | |
| 9,275,069 B1 | 3/2016 | Garrod et al. | |
| 9,301,103 B1 | 3/2016 | Thompson | |
| 9,313,233 B2 | 4/2016 | Sprague et al. | |
| 2003/0152277 A1 | 8/2003 | Hall et al. | |
| 2003/0227746 A1 | 12/2003 | Sato | |
| 2004/0193656 A1* | 9/2004 | Pizzo | G06F 16/24552 |
| 2004/0203380 A1 | 10/2004 | Hamdi et al. | |
| 2005/0097111 A1* | 5/2005 | Mukherjee | G06Q 10/10 |
| 2005/0125436 A1 | 6/2005 | Mudunuri et al. | |
| 2005/0143096 A1 | 6/2005 | Boesch | |
| 2005/0192922 A1* | 9/2005 | Edlund | G06F 16/24552 |
| 2005/0210409 A1 | 9/2005 | Jou | |
| 2006/0026168 A1* | 2/2006 | Bosworth | H04L 67/1095 |
| 2006/0116991 A1 | 6/2006 | Calderwood | |
| 2006/0149739 A1* | 7/2006 | Myers | G06F 21/6227 |
| 2006/0206235 A1 | 9/2006 | Shakes et al. | |
| 2006/0250764 A1 | 11/2006 | Howarth et al. | |
| 2007/0043744 A1 | 2/2007 | Carro | |
| 2007/0118547 A1 | 5/2007 | Gupta et al. | |
| 2007/0130541 A1 | 6/2007 | Louch et al. | |
| 2007/0198571 A1 | 8/2007 | Ferguson et al. | |
| 2007/0250491 A1 | 10/2007 | Olszak et al. | |
| 2008/0007618 A1 | 1/2008 | Yuasa | |
| 2008/0227473 A1 | 9/2008 | Haney | |
| 2008/0243770 A1* | 10/2008 | Aasman | G06F 16/28 |
| 2008/0252419 A1 | 10/2008 | Batchelor et al. | |
| 2009/0005070 A1 | 1/2009 | Forstall et al. | |
| 2009/0138790 A1 | 5/2009 | Larcheveque et al. | |
| 2009/0143052 A1 | 6/2009 | Bates et al. | |
| 2009/0156231 A1 | 6/2009 | Versteeg et al. | |
| 2009/0265105 A1 | 10/2009 | Davis et al. | |
| 2009/0315679 A1 | 12/2009 | Bauchot et al. | |
| 2010/0058212 A1 | 3/2010 | Belitz et al. | |
| 2010/0073315 A1 | 3/2010 | Lee et al. | |
| 2010/0082842 A1 | 4/2010 | Lavrov et al. | |
| 2010/0121817 A1 | 5/2010 | Meyer et al. | |
| 2010/0173619 A1 | 7/2010 | Hua et al. | |
| 2010/0185984 A1 | 7/2010 | Wright et al. | |
| 2010/0191884 A1 | 7/2010 | Holenstein et al. | |
| 2010/0214117 A1 | 8/2010 | Hazzani | |
| 2010/0223543 A1 | 9/2010 | Marston | |
| 2010/0281458 A1 | 11/2010 | Paladino et al. | |
| 2010/0306713 A1 | 12/2010 | Geisner et al. | |
| 2011/0022312 A1 | 1/2011 | McDonough et al. | |
| 2011/0093440 A1 | 4/2011 | Asakura et al. | |
| 2011/0158469 A1 | 6/2011 | Mastykarz | |
| 2011/0202557 A1 | 8/2011 | Atsmon et al. | |
| 2011/0310005 A1 | 12/2011 | Chen et al. | |
| 2012/0010812 A1 | 1/2012 | Thompson | |
| 2012/0015673 A1 | 1/2012 | Klassen et al. | |
| 2012/0032975 A1 | 2/2012 | Koch | |
| 2012/0036434 A1 | 2/2012 | Oberstein | |
| 2012/0137240 A1* | 5/2012 | Krueger | G06F 8/75 715/771 |
| 2012/0150578 A1 | 6/2012 | Mangat et al. | |
| 2012/0166929 A1 | 6/2012 | Henderson et al. | |
| 2012/0216106 A1 | 8/2012 | Casey | |
| 2012/0268269 A1 | 10/2012 | Doyle | |
| 2013/0005362 A1 | 1/2013 | Borghei | |
| 2013/0013642 A1 | 1/2013 | Klein et al. | |
| 2013/0143597 A1 | 6/2013 | Mitsuya et al. | |
| 2013/0165069 A1 | 6/2013 | Nitta et al. | |
| 2013/0196614 A1 | 8/2013 | Pahlevani | |
| 2013/0204853 A1* | 8/2013 | Tewksbary | G06F 16/2365 707/696 |
| 2013/0235749 A1 | 9/2013 | Cho et al. | |
| 2013/0262171 A1 | 10/2013 | Solodko et al. | |
| 2013/0262497 A1 | 10/2013 | Case et al. | |
| 2013/0295970 A1 | 11/2013 | Sheshadri et al. | |
| 2014/0258827 A1 | 9/2014 | Gormish et al. | |
| 2014/0302783 A1 | 10/2014 | Aiuto et al. | |
| 2014/0304836 A1* | 10/2014 | Velamoor | H04L 63/08 726/28 |
| 2014/0357299 A1 | 12/2014 | Xu et al. | |
| 2015/0080012 A1 | 3/2015 | Sprague et al. | |
| 2015/0331919 A1 | 11/2015 | Freeland et al. | |
| 2016/0110458 A1 | 4/2016 | Colgrove et al. | |

FOREIGN PATENT DOCUMENTS

| | | |
|---|---|---|
| EP | 2916276 | 9/2015 |
| WO | WO 2004/038548 | 5/2004 |

OTHER PUBLICATIONS

Notice of Allowance for U.S. Appl. No. 13/181,392 dated Jan. 22, 2015.
Notice of Allowance for U.S. Appl. No. 13/838,815 dated Jun. 19, 2015.
Notice of Allowance for U.S. Appl. No. 13/838,815 dated Jan. 29, 2015.
Notice of Allowance for U.S. Appl. No. 13/839,026 dated Mar. 11, 2016.
Notice of Allowance for U.S. Appl. No. 14/027,118 dated Feb. 4, 2016.
Notice of Allowance for U.S. Appl. No. 14/334,232 dated Nov. 10, 2015.
Notice of Allowance for U.S. Appl. No. 14/487,342 dated Sep. 23, 2015.
Notice of Allowance for U.S. Appl. No. 14/690,905 dated Nov. 23, 2015.
Official Communication for European Patent Application No. 14159447.2 dated Nov. 25, 2014.
Official Communication for European Patent Application No. 14159447.3 dated Jan. 8, 2015.
Official Communication for European Patent Application No. 15157642.8 dated Jul. 20, 2015.
Official Communication for New Zealand Patent Application No. 622501 dated Apr. 1, 2014.
Official Communication for New Zealand Patent Application No. 622501 dated Jun. 5, 2014.
Official Communication for U.S. Appl. No. 13/181,392 dated Aug. 28, 2014.
Official Communication for U.S. Appl. No. 13/831,199 dated Jun. 3, 2015.
Official Communication for U.S. Appl. No. 13/831,199 dated Oct. 6, 2015.
Official Communication for U.S. Appl. No. 13/831,199 dated May 9, 2016.
Official Communication for U.S. Appl. No. 13/839,026 dated Aug. 4, 2015.
Official Communication for U.S. Appl. No. 14/027,118 dated May 12, 2015.
Official Communication for U.S. Appl. No. 14/027,118 dated Sep. 16, 2015.
Official Communication for U.S. Appl. No. 14/088,251 dated Feb. 12, 2015.
Official Communication for U.S. Appl. No. 14/088,251 dated Apr. 18, 2016.

(56) References Cited

OTHER PUBLICATIONS

Official Communication for U.S. Appl. No. 14/088,251 dated May 20, 2015.
Official Communication for U.S. Appl. No. 14/088,251 dated Aug. 26, 2015.
Official Communication for U.S. Appl. No. 14/088,251 dated Jun. 30, 2015.
Official Communication for U.S. Appl. No. 14/196,814 dated Jun. 13, 2016.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/334,232 dated Jul. 10, 2015.
Official Communication for U.S. Appl. No. 14/487,342 dated Apr. 23, 2015.
Official Communication for U.S. Appl. No. 14/580,218 dated Jan. 7, 2016.
Official Communication for U.S. Appl. No. 14/690,905 dated Oct. 7, 2015.
Official Communication for U.S. Appl. No. 15/047,405 dated Apr. 1, 2016.
Restriction Requirement for U.S. Appl. No. 13/839,026 dated Apr. 2, 2015.

\* cited by examiner

US 11,138,236 B1

SYSTEMS AND METHODS FOR PACKAGING INFORMATION INTO DATA OBJECTS

FIELD OF THE INVENTION

This disclosure relates to approaches for providing a remote client device with access to a portion of information stored in a database by packaging the portion of the information into data object(s). The data object(s) may include application file(s) and data file(s). The application file(s) may be configured to open the data file(s) to view the portion of the information.

BACKGROUND

Under conventional approaches, database servers store information that may be accessed by one or more client systems. For example, a client system can log in to the database server, and perform various create, read, update, or delete (or, "CRUD") operations. However, in various situations, it may be beneficial to provide limited access to a portion of the information stored by the database server to one or more remote systems that are non-clients of the database server. For example, technology limitations or other constraints may not allow for an active client-server relationship between the remote systems and the database server. In various situations, it may be beneficial to provide limited access to a portion of the information stored by the database server to one or more remote systems such that the portion of the information may be viewed by the remote system(s) without having access to the database server.

SUMMARY

Various embodiments of the present disclosure may include systems, methods, and non-transitory computer readable media configured to packaging a portion of information stored in a database into data object(s). A system has access to a database storing information. The system receives a request for a portion of the information. The portion of the information may include one or more dependencies to one or more information sources. The system identifies the one or more dependencies. The system packages the portion of the information and the one or more dependencies into one or more data objects. The data object(s) allow a remote client device to view the portion of the information and the one or more dependencies without having access to the database. The data object(s) are provided by the system to the remote client device.

In some embodiments, the information stored in the database includes an object graph and the portion of the information includes a part of the object graph.

In some embodiments, the data object(s) includes a web application file and a data file. The data file includes the portion of the information and the one or more dependencies. The web application file is configured to open the data file for viewing.

In some embodiments, the system receives a change to the portion of the information from the remote client device. The change to the portion of the information is made by the remote client device without having access to the database. The system updates the portion of the information stored in the database based on the change to the portion of the information received from the remote client device. In some embodiments, the change to the portion of the information is transmitted from the remote client device to the system in response to a transition from the remote client device being disconnected from the system to being connected to the system.

In some embodiments, the remote client device has a limited write-back right to the portion of the information. The limited write-back right restricts at least one aspect of the remote client device's changing of the portion of the information. The portion of the information stored in the data is updated further based on the limited write-back right.

In some embodiments, the remote client device not having access to the database includes the remote client device not having a credential to access the information stored in the database. In some embodiments, the remote client device not having access to the database includes the remote client device not having an active network communication to access the database.

In some embodiments, the information source(s) include one or more internal information source(s). The internal information source(s) are stored in the database. In some embodiments, the information source(s) include one or more external information source(s). The external information source(s) are not stored in the database.

In some embodiments, the identification of the one or more dependencies of the portion of the information includes identification of one or more of the external information sources to which the remote client device has access. Packaging the one or more dependencies into the object(s) includes providing in the object(s) one or more references to the external information source(s) to which the remote client device has access.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
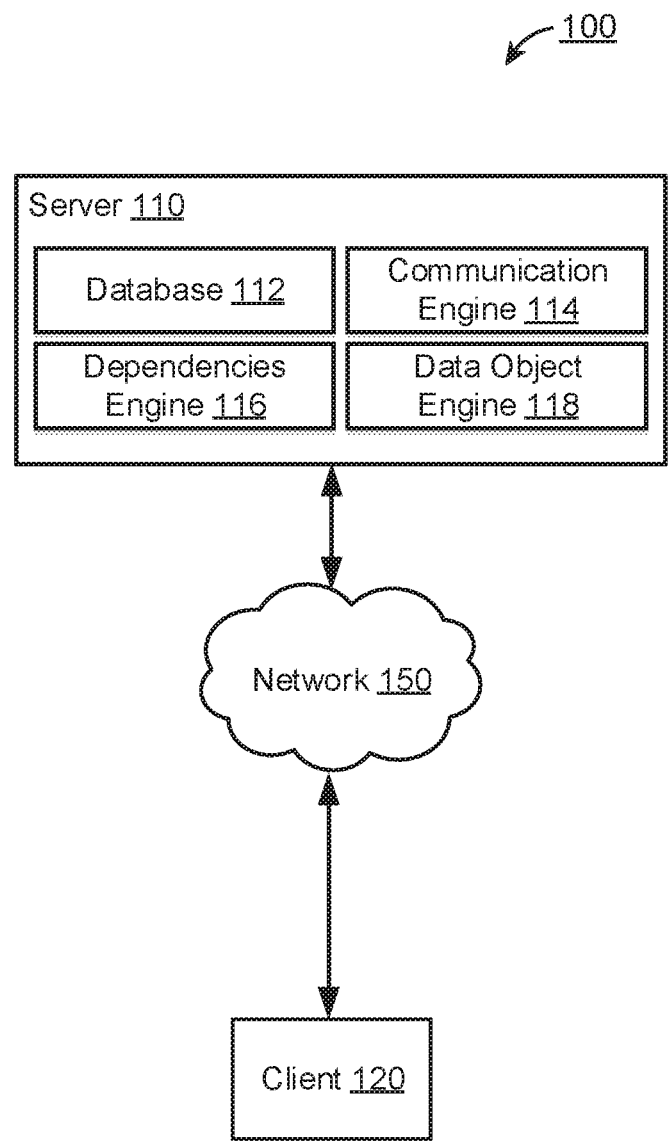
FIG. 1 illustrates an example environment for packaging a portion of information stored in a database into data object(s), in accordance with various embodiments

A claimed solution rooted in computer technology overcomes problems specifically arising in the realm of computer technology. In various implementations, a system has access to a database storing information. The system may receive a request for a portion of the information (e.g., at the system, over a communications network). The portion of the information may include one or more dependencies to one or more information sources (e.g., information links and/or related information). One or more dependencies of the portion of the information may be identified, and the portion of information, along with the one or more dependencies, may be packaged into one or more data object. The data object(s) may allow a remote client device to view the portion of information and the one or more dependencies without having access to the database. The data object(s) may be provided to the remote client device. In some embodiments, the data object(s) may include a web application file and a data file. The data file may include the portion of the information and the one or more dependencies. The web application file may be configured to open the data file for viewing. The web application file may be utilized via a web application that runs on the remote client device. In some embodiments, one or more changes to the portion of the information may be transmitted from the remote client device to the system and the portion of the information in the database may be updated. In some embodiments, the remote client device may have a limited write-back right to the portion of the information and the updates to the portion of the information may be determined based on the limited write-back right.

The systems and methods disclosed herein enable users to utilize a portion of information stored in a database without having access to the database. Not having access to the database may include: (1) a user's remote client device not having a credential to access the information stored in the database; and/or (2) the user's remote client device not having an active network communication to access the database. For example, a database server may store information in a database. It may be desirable to provide a portion of the information stored in the database without providing access to the database to non-clients (e.g., non-active clients) of the database (e.g., without giving login credential to the non-clients). Providing access to the database to non-clients may expose information stored in the database (e.g., the portion to be provided to the non-clients, dependencies, other information) to outside threat. The database/the database server may not be configured to provide fine-tuned access control to give non-clients the desired access to the portion of the information stored in the database. It may be desirable to provide one-time or limited access to a portion of the information stored in the database for use by a remote client device when the remote client device does not have active network communication (e.g., with the database server) to access the database. By obtaining the portion of the information in packaged data object form, a remote client device may utilize (e.g., view, use, alter) the portion of the information (along with its dependencies) without (1) having a credential (e.g., login credential) to access the information stored in the database; and/or (2) having an active network communication to access the database (e.g., the remote client device is operating in locations where a network connection to the server may be only periodically available, unreliable, or nonexistent).

The database server may also need to preserve the integrity of the information stored in the database (e.g., the portion/dependencies/other information to be provided in data object form) from certain changes. For example, it may be desirable to provide a portion of the information stored in the database to a particular user while restricting the user's ability to make changes to the portion of the information (or dependencies, related information) in the database. In providing the portion of the information in packaged data object form, the database server may restrict how the particular user changes the information stored in the database.

FIG. 1 illustrates an example environment 100 for packaging a portion of information stored in a database into data object(s), in accordance with various embodiments. The example environment 100 may include a server 110 and a client 120. The server 110 and the client 120 may include one or more processors and memory. The processor(s) may be configured to perform various operations by interpreting machine-readable instructions stored in the memory. The server 110 may communicate with the client 120 via a network 150. The environment 100 may also include a data store (not shown) that is accessible to the server 110 and/or the client 120 via the network 150. In some embodiments, the data store may include various databases, application functionalities, application/data packages, and/or other data that are available for download, installation, and/or execution.

In various embodiments, the server 110 may have access to information stored in one or more databases and/or other locations. The server 110 may include a database 112, a communication engine 114, a dependencies engine 116, and a data object engine 118. The database 112 may include structured set of data that can be divided/extracted/packaged for provision when needed by a client device (e.g., the client 120). The data stored in the database 112 may include raw data or processed data. For example, the database 112 may include raw data relating to people, events, locations, objects and/or other things and/or may include processed data relating to people, events, locations, objects and/or other things that have been augmented, modified, linked, and/or otherwise processed.

One or more portions of the information stored in the database 112 may include dependencies to one or more information sources. An information source may refer to a thing/location/address from which information may be obtained. An information source may include a piece of information, collection/combination of pieces of information, modification of information (e.g., processing information in a particular way, equations to change particular information), and/or other information. A dependency of a piece of information to an information source may refer to a reliance on the piece of information to the information source. For example, a value/characteristic of a first piece of information (a portion of information stored in the database 112) may depend on a value/characteristic of a second piece of information (an information source). In some embodiments, one or more dependencies of information to information sources may be defined via information links, references, and/or other dependencies. In some embodiments, one or more dependencies may include a direct dependency (a first piece of information is directly dependent on a second piece of information) and/or an indirect dependency (a first piece of information is indirectly dependent on a second piece of information through a third piece of information).

In some embodiments, one or more information sources may include one or more internal information sources. An internal information source may refer to an information source stored in the database 112. For example, a piece of information stored in the database 112 may rely on one or more pieces of information stored in the database 112. In some embodiments, one or more information sources may include one or more external information sources. An external information source may refer to an information source not stored in the database 112. For example, a piece of information stored in the database 112 may rely on one or more pieces of information stored remotely from the database 112. The database 112 may include information links and/or references to the external piece of information such that a retrieval of the piece of information stored in the database 112 includes retrieval of the external piece of information via information links and/or references (e.g., retrieving the external piece of information via network links). A non-client/remote client device (e.g., the client 120) may or may not have access to one or more internal information sources and/or external information sources. For example, the database 112 may store information which relies on a particular stock data which is retrieved from a source external to the database 112. The client 120 may or may not have access to the particular stock data.

Although the database 112 is shown in FIG. 1 as being located within the server 110, this is merely an example and is not limiting. The database 112 may be located in a single location (e.g., single storage location) or across multiple locations (e.g., multiple storage locations). Although the database 112 is shown in FIG. 1 as a single entity, this is merely for ease of reference and is not limiting. In some embodiments, the database 112 may comprise a plurality/collection/combination of databases.

The communication engine 114 may be configured to enable the server 110 to communicate with one or more remote client devices (e.g., the client 120) and/or other devices. The communication engine 114 may be configured to receive one or more requests for one or more portions of information stored in the database 112. The communication engine 114 may receive a request from a user of the server 110, a user of the client 120 (e.g., via the network 150), and/or other users. For example, the information stored in the database 112 may include an object graph and the portion of the information requested may include a part of the object graph. The portion of the information may include one or more dependencies to one or more information sources. For example, the part of the object graph requested may include one or more dependencies to internal and/or external information sources. The communication engine 114 may be configured to provide one or more data objects (including the portion of the information and the dependencies) to a remote client device (e.g., the client 120). Such provision of the portion of the information stored in the database 112 may allow the client 120 to view the portion of the information without having access (e.g., not having a credential, not having active network communication) to the database 112. The client 120 may view the portion of the information in native form, simulating the client 120 having a server-client relationship with the server 110 and the client 120 having access to the database 112 through the network 150.

In some embodiments, the scope of use of the data objects by the remote client devices may be restricted. The scope of the use may be restricted based on a user type, a user identifier, a remote client device type, a remote client device identifier, and/or other criteria. For example, certain users/remote client devices may be provided with the capability to use the data object(s) to view the information/dependencies stored in the data object(s). Certain users/remote client devices may be provided with the capability to make changes to the information/dependencies stored in the data object(s) (e.g., modify included information/dependencies, enter new information/dependencies). Certain users/remote client devices may be provided with the capability to send back changes to the information/dependencies stored in the data objects to the server 110 for incorporation into the database 112.

In some embodiments, the communication engine 114 may be configured to send updates for data objects to remote client devices. For example, subsequent to an initial provision of data object(s) to the client 120, the portion of the information/dependencies contained in the data object(s) may be changed in the database 112 (and/or in internal/external information sources). The communication engine 114 may send updates for previously sent data object(s) to the client 120 to provide the client 120 with updated portion of the information/dependencies. The updates for the data object(s) may include changes to the data object(s) (e.g., including information that have changed) to be incorporated into the portion of the information/dependencies included in previously sent data object(s) or may include updated version(s) of the data object(s) to replace previously sent data object(s).

In some embodiments, updates for the data objects may be sent to remote client devices when the communication engine 114 determines that a connection between the server 110 and the client 120 is reestablished (e.g., the network communication between the server 110 and the client 120 is broken and then reestablished). The communication engine 114 may send updates that were prepared when the network communication between the server 110 and the client 120 was down. In some embodiments, updates for the data objects may be sent to remote client devices based on user command (e.g., pushing updates to the client 120 by a user of the server 110; requesting updates by a user of the client 120).

In some embodiments, the communication engine 114 may be configured to receive one or more changes to the portion of the information from remote client devices. Changes to the portion of the information may include changes to the information stored in the database 112 (e.g., changes in relationships among objects in an object graph) and/or dependencies relating to the information stored in the database 112. The changes to the portion of the information may be made by the remote client device not having access to the database 112. In some embodiments, changes to the portion of the information may be transmitted from the remote client device (e.g., the client 120) to the server 110 and received by the communication engine 114 in response to a transition from the remote client device being disconnected from the server 110 to being connected to the server 110.

The received change(s) to the portion of the information may be incorporated into the database 112. The portion of the information stored in the database 112 may be updated based on the change(s) received from the remote client device. In some embodiments, a remote client device may have a limited write-back right to the portion of the information. A limited write-back right may restricts one or more aspects of the remote client device's changing of the portion of the information stored in the database 112. The portion of the information stored in the database 112 may be updated further based on the limited write-back right. For example, the limited write-back right may restrict the type of changes (e.g., native file changes, metadata changes, dependency changes) that may be made to the information stored in the database 112 by the remote client device. The limited write-back right may restrict the timing of changes (e.g., when changes from the remote client device is incorporated into the database 112, a timing window in which changes from the remote client device may be received by the server 110, a timing window in which the remote client device may make the changes) that may be made to the information stored in the database 112 based on changes received from the remote client device. The limited-write back right may restrict the changes from being received/incorporated based on network conditions. In some embodiments, changes from the remote client device may go through an approval process (e.g., automatic and/or user-controlled) to confirm the changes before they are incorporated into the database 112.

In some embodiments, the communication engine 114 may record lineage/history of changes in the information/dependencies stored in the database 112. In some embodiments, the communication engine 114 may utilize vector clocks to keep track of changes being made/provided to the information/dependencies stored in the database 112

The dependencies engine 116 may be configured to identify one or more dependencies of the portion of the information. The dependencies engine 116 may analyze/parse the portion of the information requested by the remote client device (e.g., the client 120) and determine one or more dependencies of the portion of the information to one or more information sources (internal information sources, external information sources). The dependencies engine 116 may analyze/parse information links, references, and/or other dependencies of the portion of the information to identify direct and/or indirect dependencies, and the sources of the information on which the portion of the information is dependent. In some embodiments, the dependencies engine 116 may be configured to identify one or more internal information sources and/or external information sources to which the remote client device has access. For example, a portion of information requested by the remote client device may depend on an external piece of information relating to a particular stock data retrieved via links/references. The remote client device may or may not have access to the particular stock data. The dependencies engine 116 may identify to which information sources the remote client device has access and to which information sources the remote client device does not have access.

The data object engine 118 may be configured to package a portion of the information (e.g., including one or more dependencies) stored in the database 112 into one or more data objects. Packaging the portion of the information stored in the database 112 may effectuate exporting of the information in data object form. The data object(s) may allow a remote client device to view, use, and/or alter the portion of the information (including one or more dependencies) without having access to the database 112. For example, the information stored in the database 112 may include an object graph and the portion of the information packaged into data object(s) may include one or more parts of the object graph (e.g., objects, relationships among objects). The data object(s) may include properties of the objects in the part(s) of the object graph. The data object(s) may include relationships (direct and/or indirect relationships) of the objects in the part(s) of the object graph). For example, one data object may contain descriptions (e.g., properties, links) of objects contained with the exported part of the object graph and another data object may include descriptions of the ontology for the objects. In some embodiments, using the two objects, a remote client device may view the packaged information/dependencies in native form, simulating the remote client device having a server-client relationship with the server 110 and the remote client device having access to the database 112 through the network 150.

In some embodiments, the data object engine 118 may be configured to generate updates for the data object(s). The updates for the data object(s) may include changes to the data object(s) (e.g., including information that have changed) to be incorporated into the portion of the information/dependencies included in previously sent data object(s) and/or may include updated version(s) of the data object(s) to replace previously sent data object(s).

In some embodiments, the data object engine 118 may package dependencies of the portion of the information differently based on a remote client device's access to information sources. For example, based on a remote client device not having access to a particular information source (internal and/or external information source) from which the portion of the information depends, the data object engine 118 may package information provided by the particular information source (e.g., native file, file content, metadata, relationships) directly into the data object(s). Based on a remote client device having access to a particular information source from which the portion of the information depends, the data object engine 118 may package references/links to the information source into the data object(s). Packaging references/links into the data object(s) may enable the remote client device to pull the most recent information from the information sources when accessing the data object(s). In some embodiments, the data object engine 118 may package both information provided by the information sources and the references/links into the data object(s). Information packaged in the data object(s) may be used (e.g., as a backup) if the references/links in the data object(s) cannot be used.

In some embodiments, the data object(s) may include one or more application files (e.g., web application file(s)), one or more data files, and/or other files. The data file(s) may include the portion of the information (including dependencies) requested by the remote client device. The application file(s) may be configured to open the data file(s), enabling the viewing, using, and/or altering of the packaged information/dependencies. For example, a web application file may include an HTML file that runs Javascript, and a data file may be dropped into/opened by a browser program running the HTML file to access the packaged information/dependencies. The web application/web application file may provide a shell/interface for interacting with the packaged information/dependencies.

In some embodiments, one or more application files may be generic as to data files or types of data files. For example, a web application may be configured to open all types of data files or specific type(s) of data files. In some embodiments, one or more application files may be specific to one or more data files. For example, the data object engine 118 may package the portion of the information and the dependence into a data file that can only be opened by a specific web application file. Restricting the use of the data file to a specific web application file may provide security protection for the information contained within the data file.

In some embodiments, data object(s) may only include data file(s) and may not include application file(s). In some embodiments, data object(s) may only include application file(s) and may not include data file(s). For example, the portion of the information (including dependences)

requested by the remote client device may be packaged into one or more application files.

In some embodiments, one or more data objects may include one or more functionalities for viewing, using, and/or altering the information/dependencies packaged in the data object(s). Functionalities may refer to different data analysis module/tools to perform different data tasks in viewing, using, and/or altering the information/dependencies packaged in the data object(s). Functionalities may include different levels of permissions to restrict the type of actions that may be taken with the information/dependencies packaged in the data object(s). The data object engine 118 may have preset and/or previously defined sets of functionalities for different information/users/remote client devices. The data object engine 118 may enable a user (e.g., a user of the server 110, a user of the client 120) to select the functionalities to be included in the data object(s).

Figure 2:
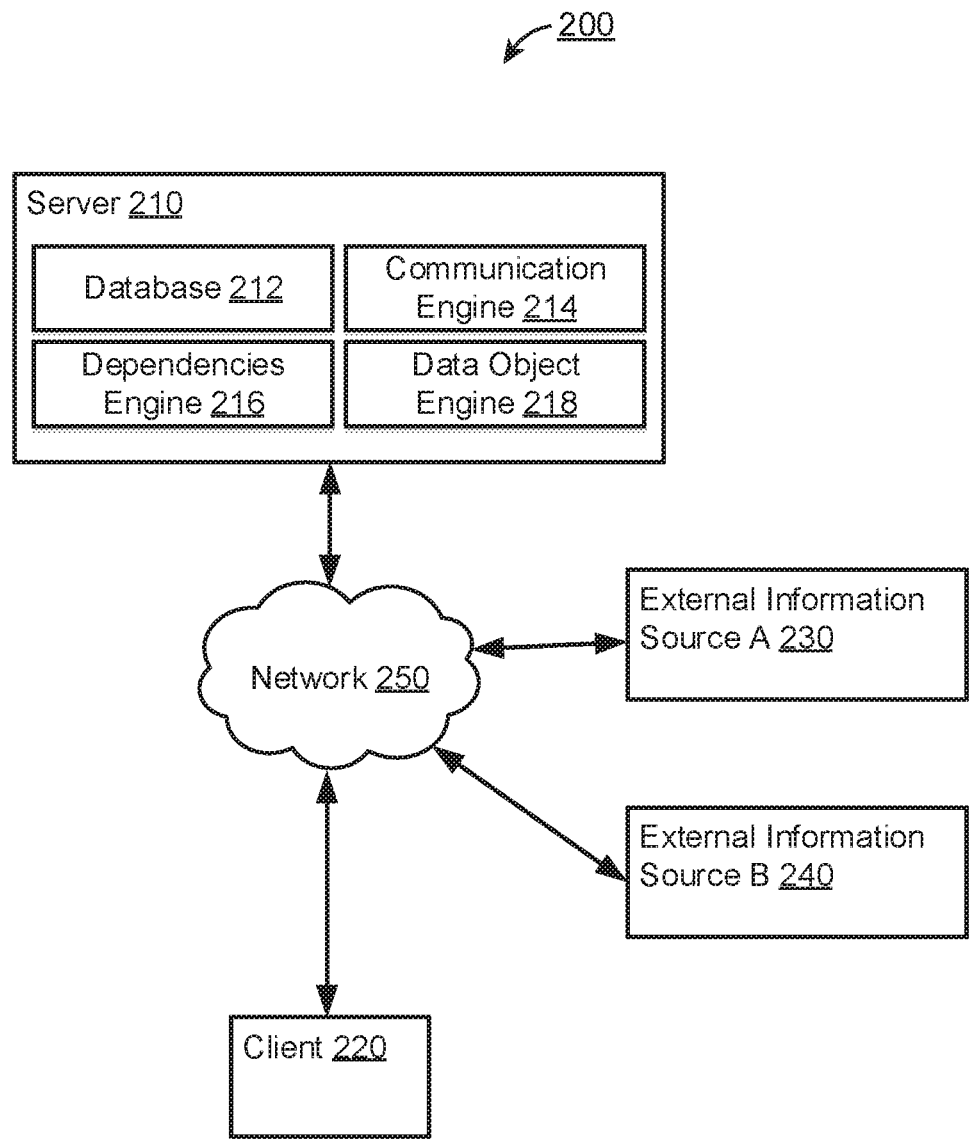
FIG. 2 illustrates an example environment for packaging a portion of information stored in a database into data object(s), in accordance with various embodiments.

FIG. 2 illustrates an example environment 200 for packaging a portion of information stored in a database into data object(s), in accordance with various embodiments. The example environment 200 may include a server 210, a client 220, an external information source A 230, and an external information source B 240. The server 210 and the client 220 may include one or more processors and memory. The processor(s) may be configured to perform various operations by interpreting machine-readable instructions stored in the memory. The server 210 may communicate with the client 220 via a network 250. The external information source A 230 and/or the external information source B 240 may communicate with the server 210 and/or the client 220 via the network 250. The environment 200 may also include a data store (not shown) that is accessible to the server 210 and/or the client 220 via the network 250. In some embodiments, the data store may include various databases, application functionalities, application/data packages, and/or other data that are available for download, installation, and/or execution. In some embodiments, the server 210 may be configured to implement some, or all, of the functionalities of the server 110 as described above. In some embodiments, the client 220 may be configured to some, or all, of the functionalities of the client 120 as described above.

In various embodiments, the server 210 may have access to information stored in one or more databases and/or other locations. The server 210 may include a database 212, a communication engine 214, a dependencies engine 216, and a data object engine 218. In some embodiments, the database 212, the communication engine 214, the dependencies engine 216, and the data object engine 218 may be configured to some, or all, of the functionalities of the database 112, the communication engine 114, the dependencies engine 116, and the data object engine 118, respectively, as described above. The database 212 may include structured set of data that can be divided/extracted/packaged for provision when needed by a client device (e.g., the client 220). The data stored in the database 212 may include raw data or processed data. For example, the database 212 may include raw data relating to people, events, locations, objects and/or other things and/or may include processed data relating to people, events, locations, objects and/or other things that have been augmented, modified, linked, and/or otherwise processed.

One or more portions of the information stored in the database 212 may include dependencies to one or more information sources. In some embodiments, one or more information sources may include one or more internal information sources (stored within the database 212). In some embodiments, one or more information sources may include one or more external information sources (not stored in the database 212). For example, the environment 200 may include the external information source A 230 and the external information source B 240. A piece of information stored in the database 212 may rely on one or more pieces of information stored remotely from the database 212 (e.g., in the external information source A 230, the external information source B 240). The database 212 may include information links and/or references to the external piece of information such that a retrieval of the piece of information stored in the database 212 includes retrieval of the external piece of information via information links and/or references (e.g., retrieving the external piece of information via network links). A non-client/remote client device (e.g., the client 220) may or may not have access to one or more internal information sources and/or external information sources. For example, the database 212 may store information which relies on information retrieved from the external information source A 230 and information retrieved from the external information source B 240. The client 220 may have access to the external information source A 230 and may not have access to the external information source B 240.

Although the database 212 is shown in FIG. 2 as being located within the server 210, this is merely an example and is not limiting. The database 212 may be located in a single location (e.g., single storage location) or across multiple locations (e.g., multiple storage locations). Although the database 212 is shown in FIG. 2 as a single entity, this is merely for ease of reference and is not limiting. In some embodiments, the database 212 may comprise a plurality/collection/combination of databases.

The communication engine 214 may be configured to enable the server 210 to communicate with one or more remote client devices (e.g., the client 220) and/or other devices. The communication engine 214 may be configured to receive one or more requests for one or more portions of information stored in the database 212. The communication engine 214 may receive a request from a user of the server 210, a user of the client 220 (e.g., via the network 250), and/or other users. A portion of the information may include one or more dependencies to one or more information sources (e.g., the external information source A 230, the external information source B 240). The communication engine 214 may be configured to provide one or more data objects (including the portion of the information and the dependencies) to a remote client device (e.g., the client 220). Such provision of the portion of the information stored in the database 212 may allow the client 220 to view the portion of the information without having access (e.g., not having a credential, not having active network communication) to the database 212. The client 220 may view the portion of the information in native form, simulating the client 220 having a server-client relationship with the server 210 and the client 220 having access to the database 212 through the network 250. In some embodiments, the scope of use of the data objects by the remote client devices may be restricted. In some embodiments, the communication engine 214 may be configured to send updates for data objects to remote client devices. The communication engine 214 may be configured to receive one or more changes to the portion of the information from remote client devices. The received change(s) to the portion of the information may be incorporated into the database 212.

The dependencies engine 216 may be configured to identify one or more dependencies of the portion of the information. The dependencies engine 216 may analyze/parse the portion of the information requested by the remote client device (e.g., the client 220) and determine one or more dependencies of the portion of the information to one or more information sources (internal information sources, external information sources). The dependencies engine 216 may analyze/parse information links, references, and/or other dependencies of the portion of the information to identify direct and/or indirect dependencies, and the source of the information on which the portion of the information is dependent. In some embodiments, the dependencies engine 216 may be configured to identify one or more internal information sources and/or external information sources to which the remote client device has access. For example, a portion of information requested by the remote client device may depend on information retrieved from the external information source A 230 and information retrieved from the external information source B 240. The client 220 may have access to the external information source A 230 and may not have access to the external information source B 240. The dependencies engine 116 may identify the external information source A 230 as an information source to which the client 220 has access and the external information source B 240 as an information source to which the client 220 does not have access.

The data object engine 218 may be configured to package a portion of the information (e.g., including one or more dependencies) stored in the database 212 into one or more data objects. Packaging the portion of the information stored in the database 212 may effectuate exporting of the information in data object form. The data object(s) may allow a remote client device to view, use, and/or alter the portion of the information (including one or more dependencies) without having access to the database 212. Using the data object(s), a remote client device (e.g., the client 220) may view the packaged information/dependencies in native form, simulating the remote client device having a server-client relationship with the server 210 and the remote client device having access to the database 212 through the network 250. In some embodiments, the data object engine 218 may be configured to generate updates for the data object(s).

The data object engine 218 may package dependencies of the portion of the information differently based on a remote client device's access to information sources. For example, based on a remote client device not having access to a particular information source (e.g., the external information source B 240) from which the portion of the information depends, the data object engine 218 may package information provided by the particular information source (e.g., .native file, file content, metadata, relationships) directly into the data object(s). Based on a remote client device having access to a particular information source (e.g., the external information source A 230) from which the portion of the information depends, the data object engine 218 may package references/links to the information source into the data object(s). Packaging references/links into the data object(s) may enable the remote client device to pull the most recent information from the information sources when accessing the data object(s). In some embodiments, the data object engine 218 may package both information provided by the information sources and the references/links into the data object(s). Information packaged in the data object(s) may be used (e.g., as a backup) if the references/links in the data object(s) cannot be used.

In some embodiments, the data object(s) may include one or more application files (e.g., web application file(s)), one or more data files, and/or other files. The data file(s) may include the portion of the information (including dependencies) requested by the remote client device. The application file(s) may be configured to open the data file(s), enabling the viewing, using, and/or altering of the packaged information/dependencies. In some embodiments, one or more application files may be generic as to data files or types of data files. In some embodiments, one or more application files may be specific to one or more data files. For example, the data object engine 218 may package the portion of the information and the dependence into a data file that can only be opened by a specific web application file. Restricting the use of the data file to a specific web application file may provide security protection for the information contained within the data file. In some embodiments, one or more data objects may include one or more functionalities for viewing, using, and/or altering the information/dependencies packaged in the data object(s).

Figure 3:
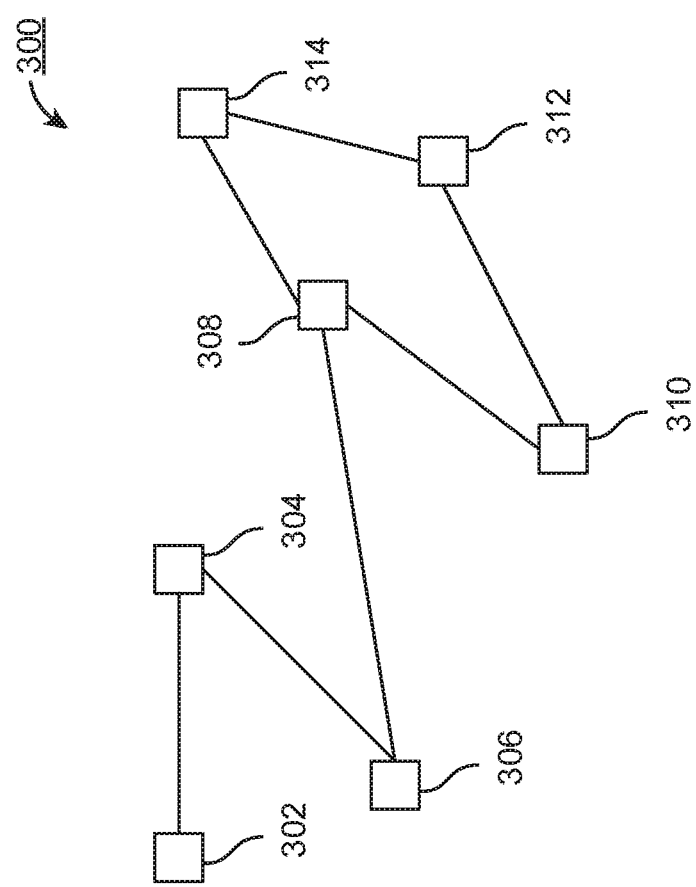
FIG. 3 illustrates an example object graph, in accordance with various embodiments.

FIG. 3 illustrates an example object graph 300, in accordance with various embodiments. The object graph 300 may represent the entirety or a portion of one or more object graphs stored in a database (e.g., the database 112, the database 212). The object graph 300 may represent the portion of information (including dependencies) requested for packaging into data object(s). The object graph 300 may include objects 302, 304, 306, 308, 310, 312, 314, with direct and indirect relationships among the objects 302, 304, 306, 308, 310, 312, 314 as shown by lines in FIG. 3. In some embodiments, the lines may be directed and the directed lines may indicate a direction of relationship among objects (e.g., an appearance of a particular object in another object, a membership of a particular object in another object, a reliance of a particular object on another object, and/or other relationships among objects). Individual objects 302, 304, 306, 308, 310, 312, 314 may represent one or more entities, things, events, locations, time, and/or other tangible/intangible things. One or more objects 302, 304, 306, 308, 310, 312, 314 may include one or more dependencies to one or more information sources (e.g., internal and/or external). The objects 302, 304, 306, 308, 310, 312, 314 and/or relationships among the objects 302, 304, 306, 308, 310, 312, 314 may include/be associated with properties, metadata, media items (e.g., document, presentation, image, video, audio) and/or other characteristics/things. The object graph 300 (along with dependencies, relationships, properties, metadata, media items, other characteristics/thing) may be packaged in one or more objects (e.g., by the dependencies engine 116, the dependencies engine 216) for provision to remote client devices.

Figure 4:
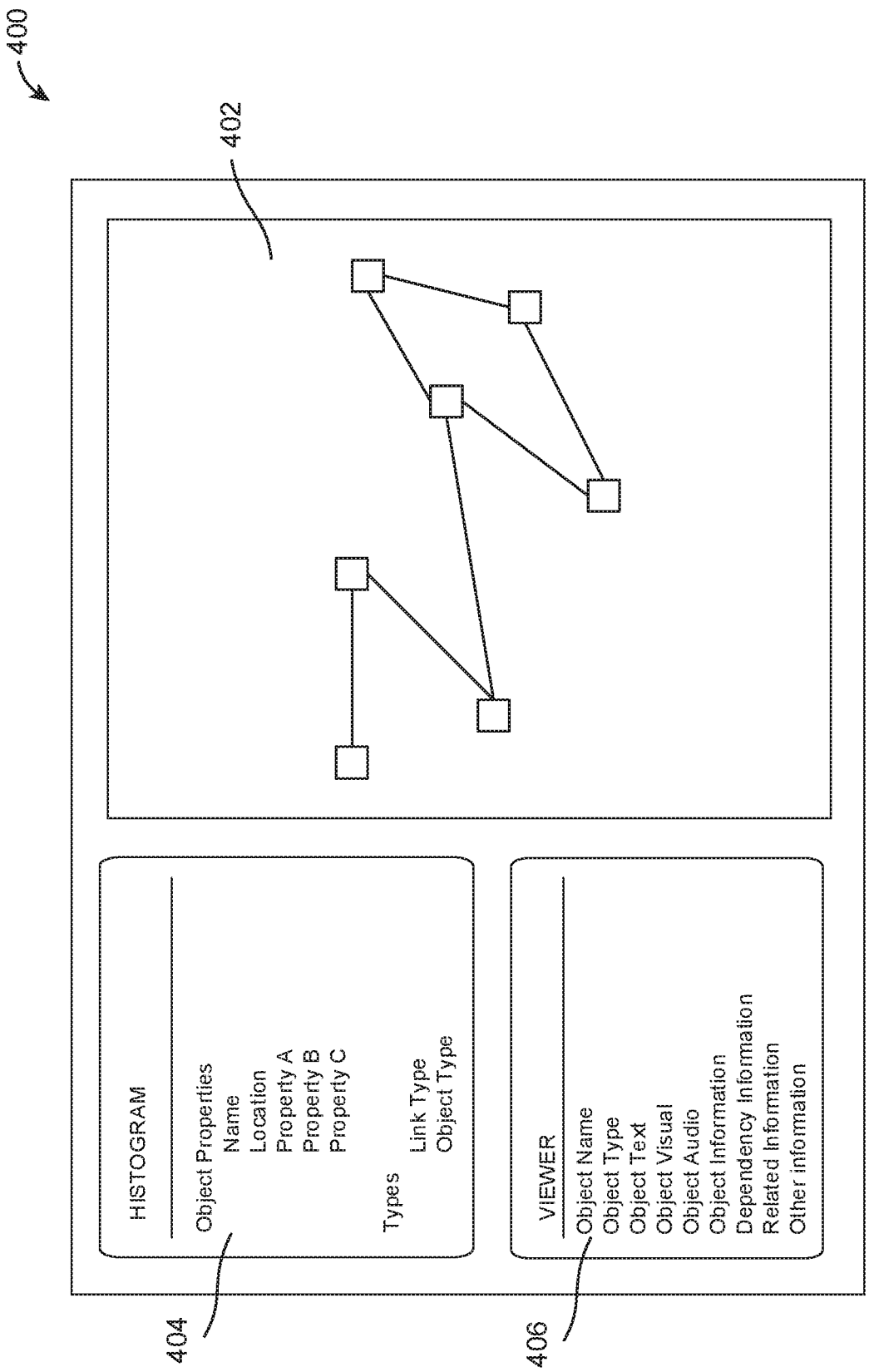
FIG. 4 illustrates an example interface for viewing a portion of information packaged into data object(s), in accordance with various embodiments.

FIG. 4 illustrates an example interface 400 for viewing a portion of information packaged into data object(s), in accordance with various embodiments. A user may use the interface 400 from a terminal (e.g., coupled with a remote client device) to utilize (view, use alter) the packaged information/dependencies without having access to the database (e.g., the database 112, the database 212) from which the information/dependencies was packaged. The interface 400 may include a visual section 402, a histogram section 404, and a viewer section 406. Other/different visuals within the interface 400 are contemplated.

The visual section 402 may provide visual representation of the packaged information/dependencies. For example, as shown in FIG. 4, the visual section 402 may provide a view of an object graph packaged into data object(s). The visual section 402 may provide information about the object graph. For example, individual objects may be displayed with pictures/videos/properties of the associated entity/thing and the types/identifiers of relationships between objects may be displayed along/near the lines between the objects. A user may select one or more objects and/or relationships via interacting with the object graph within the visual section 402. For example, a user may select a particular object to view information about the selected object and/or make changes to the object/relationships of the object.

The histogram section 404 may provide options for a user to select/view particular information about one or more objects/relationships. For example, a user may select one or more object properties and/or types to display information about the selected object properties/types within the histogram section 404. The histogram section 404 may display numerical/count information about the selected object properties/types within the object graph displayed in the visual section 402. For example, the histogram section 404 may display numerical/count information relating to name, location, link type, object type, and/or other properties of the entities/relationships within the object graph. Selection of a particular information displayed in the histogram section 404 may effectuate changes within the visual section 402. For example, selection of a particular location displayed in the histogram section 404 may result in the objects/relationships associated with the particular location to be highlighted in the visual section 402. Other uses of histogram section 404 are contemplated.

The view section 406 may display information regarding the object graph displayed in the visual section 402 and/or information regarding one or more objects/relationships selected within the object graph. For example, responsive to a user's selection of one or more objects/relationships shown in the visual section 402, the view section 406 may display information associated with the selected objects/relationships, such as properties/object content (e.g., name, type, text, visual, audio, dependency, related information), metadata, media items (e.g., document, presentation, image, video, audio) and/or other characteristics/things. Presentation of other information are contemplated.

The interface 400 may include other functionalities to allow a user to utilize the packaged information/dependencies. For example, the interface 400 may include a searching field to allow a user to search for a particular object/relationship, a selection field to allow a user to select particular objects/relationships, modification tools to modify the objects/relationships, and/or other fields for other tasks.

Figure 5:
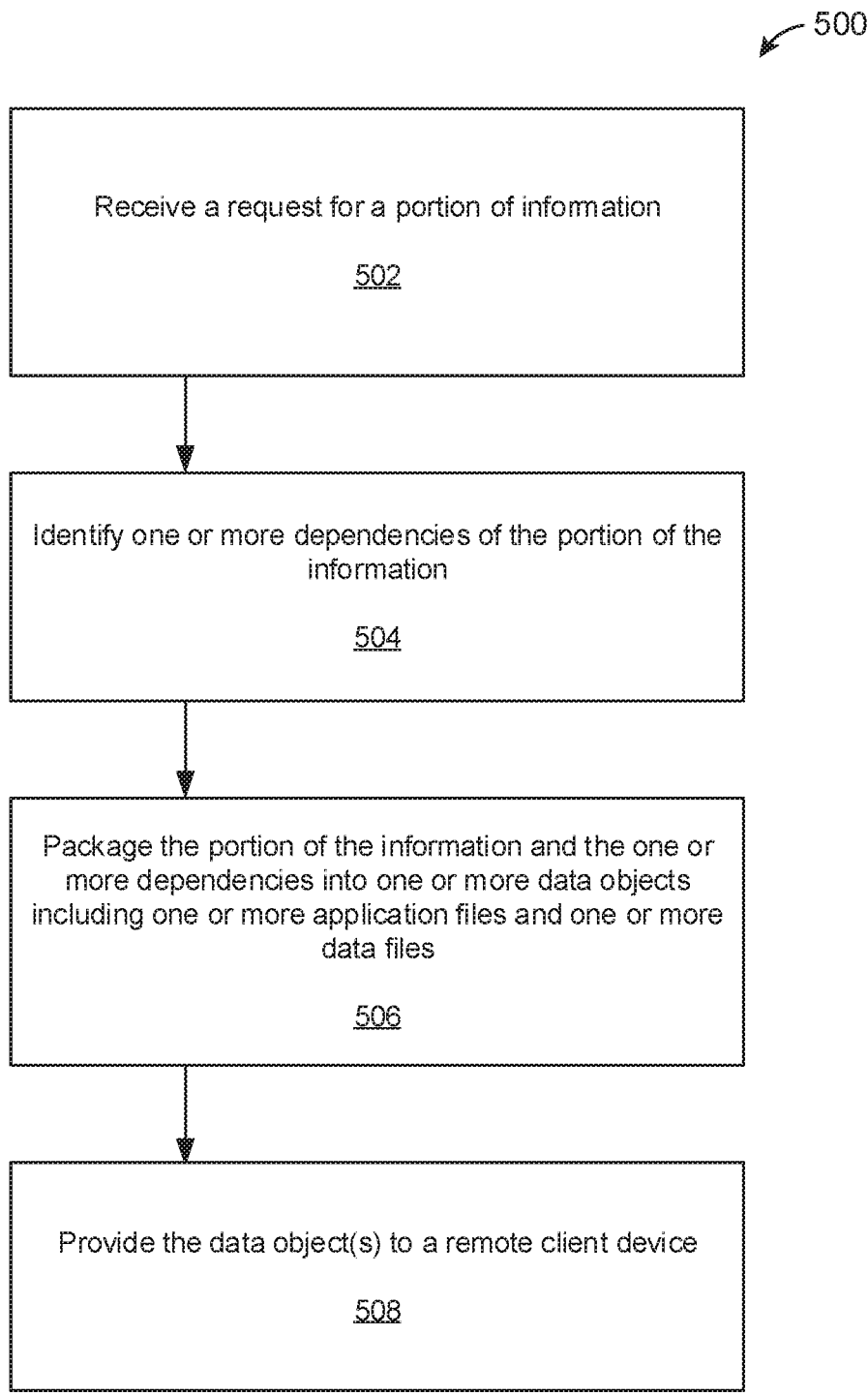
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a request for a portion of information may be received. The information may be stored in a database. The portion of the information may include one or more dependencies to one or more information sources. At block 504, the one or more dependencies of the portion of the information may be identified. At block 506, the portion of the information and the one or more dependencies may be packaged into one or more data objects. The data object(s) include application file(s) and data file(s). The data object(s) may allow a remote client device to view the portion of the information and the one or more dependencies without having access to the database. At block 508, the data object(s) may be provided to the remote client device.

While FIG. 5 shows data object(s) including application file(s) and data file(s), this is merely an example and is not limiting. In some embodiments, data object(s) may only include data file(s) and may not include application file(s). In some embodiments, data object(s) may only include application file(s) and may not include data file(s).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
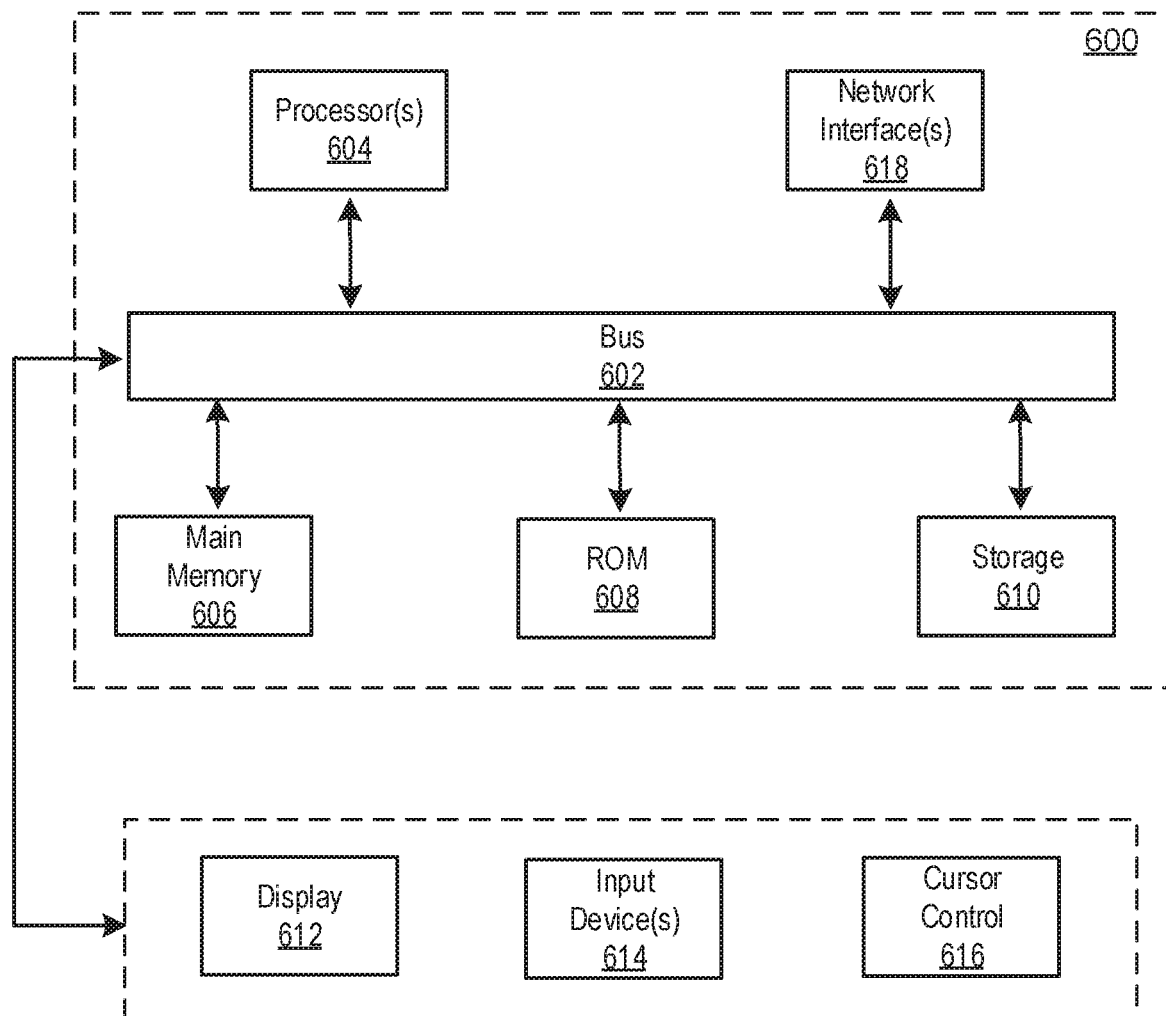
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A server system comprising:
one or more processors; and
memory storing instructions that, when executed by the one or more processors, cause the server system to perform:
receiving, from a remote computing device, a request for a portion of information, the information stored in a database of the server system, the database being inaccessible to the remote computing device, the portion of the information including one or more dependencies to one or more information sources;
identifying the one or more dependencies of the portion of the information;
determining whether the remote computing device has access to a source at which a dependency of the one or more dependencies is stored, the dependency including a second portion of information;
packaging the portion of the information and the one or more dependencies into one or more data objects, the packaging comprising:
in response to determining that the remote computing device has no access to the source, directly packaging, along with the portion, the dependency stored in the source, to provide the portion and the dependency to the remote computing device, the direct packaging including providing:
the portion including the dependency,
metadata of the dependency,
a dependency relationship associated with the dependency, and
logic defining when an alteration to the metadata and to the dependency relationship are incorporated into the database based on a strength of a connection between the database and the remote computing device,
at the remote computing device in native format to simulate the remote client device having access to the database, the remote computing device comprising a stand-alone computing device capable of functioning independent of the server system and the database;
receiving the alteration to the metadata and to the dependency relationship associated with the dependency from the remote computing device; and
importing the alteration into the database based on the strength of the connection between the database and the remote computing device.

2. The server system of claim 1, wherein the instructions further cause the server system to perform:
receiving a change to the portion of the information from the remote computing device, the change to the portion of the information made by the remote computing device without having access to the database; and
updating the portion of the information stored in the database based on the change to the portion of the information received from the remote computing device.

3. The server system of claim 2, wherein the change to the portion of the information is transmitted from the remote computing device to the system in response to a transition from the remote computing device being disconnected from the system to being connected to the system.

4. The server system of claim 1, wherein:
the remote computing device has a limited write-back right to the portion of the information;
the limited write-back right restricts a timing of when the alteration is allowed to be received and imported to the database; and
the portion of the information stored in the database is updated further based on the limited write-back right.

5. The server system of claim 1, wherein the remote computing device does not have an active network communication to access the database.

6. The server system of claim 1, wherein the one or more data objects include a web application file and a data file including the portion of the information and the dependency, the web application file configured to open the data file for viewing.

7. The server system of claim 1, wherein the one or more information sources include one or more external information sources, the one or more external information sources not stored in the database.

8. The server system of claim 7, wherein:
the identification of the one or more dependencies of the portion of the information includes identification of one or more of the external information sources to which the remote computing device has access; and
packaging the one or more dependencies into the one or more objects include providing in the one or more objects one or more references to the one or more of the external information sources to which the remote computing device has access.

9. The server system of claim 1, wherein the one or more dependencies comprise a direct dependency between the portion of the information and the one or more information sources and an indirect dependency in which the portion of the information is dependent upon a third piece of information.

10. The server system of claim 1, wherein the instructions further cause the server system to perform:
    determining whether the alteration by the remote computing device is approved before the alteration is incorporated into the database.

11. The server system of claim 1, wherein the one or more data objects comprise descriptions of the data objects and descriptions of ontologies of the respective objects.

12. The server system of claim 1, wherein the instructions further cause the server system to perform:
    sending changes, to the remote computing device, to be incorporated into the previously sent data objects, or sending replacement data objects, to the remote computing device, to replace the previously sent data objects.

13. The server system of claim 1, wherein the receiving the alteration further include adding a new dependency relationship between the portion and the one or more information sources.

14. The server system of claim 1, wherein the instructions further cause the server system to perform:
    detecting that a previously broken connection, due to a second strength of a second connection between another remote client device and the database falling below a threshold strength, has been reestablished;
    in response to the detecting, sending the imported alteration to the another remote computing device to be incorporated in the one or more data objects previously sent to the another remote computing device.

15. The server system of claim 1, wherein the identifying the one or more dependencies comprises identifying a direct dependency between a portion of the information and an information source and an indirect dependency between the portion and a second information source referred or linked by the information source; and the instructions further cause the server system to perform:
    displaying in a first section of an interface:
        a pictorial view of the direct dependency between the portion of the information and the information source and the indirect dependency among the portion, the information source, and the second information source; and
        a multimedia file associated with the portion of the information;
    displaying, in a second section of the interface, information about the portion of the information, the information source, the second information source, the direct dependency, and the indirect dependency;
    displaying, in a third section of the interface; metadata associated with the portion of the information; and
    in response to detecting a selection of the portion of the information, the information source, the second information source, the direct dependency, or the indirect dependency in the second section, updating the first section to emphasize the selected portion of the information and updating the third section to display updated metadata.

16. A method implemented by a server computing system including one or more processors and storage media storing machine-readable instructions, wherein the method is performed using the one or more processors, the method comprising:
    receiving, from a remote computing device, a request for a portion of information, the information stored in a database of the server system, the database being inaccessible to the remote computing device, the portion of the information including one or more dependencies to one or more information sources;
    identifying the one or more dependencies of the portion of the information;
    determining whether the remote computing device has access to a source at which a dependency of the one or more dependencies is stored, the dependency including a second portion of information;
    packaging the portion of the information and the one or more dependencies into one or more data objects, the packaging comprising:
        in response to determining that the remote computing device has no access to the source, directly packaging, along with the portion, the dependency stored in the source, to provide the portion and the dependency to the remote computing device, the direct packaging including providing:
            the portion including the dependency,
            metadata of the dependency,
            a dependency relationship associated with the dependency, and
            logic defining when an alteration to the metadata and to the dependency relationship are incorporated into the database based on a strength of a connection between the database and the remote computing device,
        at the remote computing device in native format to simulate the remote client device having access to the database, the remote computing device comprising a stand-alone computing device capable of functioning independent of the server system and the database;
    receiving the alteration to the metadata and to the dependency relationship associated with the dependency from the remote computing device; and
    importing the alteration into the database based on the strength of the connection between the database and the remote computing device.

17. The method of claim 16, further comprising:
    receiving a change to the portion of the information from the remote computing device, the change to the portion of the information made by the remote computing device without having access to the database; and
    updating the portion of the information stored in the database based on the change to the portion of the information received from the remote computing device.

18. The method of claim 16, wherein:
    the remote computing device has a limited write-back right to the portion of the information;
    the limited write-back right restricts a timing of when the alteration is allowed to be received and imported to the database; and
    the portion of the information stored in the database is updated further based on the limited write-back right.

19. The method of claim 16, wherein:
    the identification of the one or more dependencies of the portion of the information includes identification of one or more of the external information sources external to the database to which the remote computing device has access; and
    packaging the one or more dependencies into the one or more objects include providing in the one or more objects one or more references to the one or more of the external information sources to which the remote computing device has access.

* * * * *